United States Patent
Daly et al.

(10) Patent No.: US 9,836,233 B2
(45) Date of Patent: * Dec. 5, 2017

(54) VIRTUAL STORAGE SYSTEM AND METHODS OF COPYING ELECTRONIC DOCUMENTS INTO THE VIRTUAL STORAGE SYSTEM

(71) Applicant: Virtual Strongbox, Inc, Charlotte, NC (US)

(72) Inventors: Ronald M. Daly, Cornelius, NC (US); Leonard Giambalvo, Fort Mill, SC (US); Robert Jacob Smilie, Concord, NC (US)

(73) Assignee: Virtual Strongbox, Inc., Cornelius, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,762

(22) Filed: Dec. 12, 2016

(65) Prior Publication Data

US 2017/0090799 A1    Mar. 30, 2017

Related U.S. Application Data

(63) Continuation of application No. 13/751,982, filed on Jan. 28, 2013, now Pat. No. 9,552,496.

(51) Int. Cl.
G06F 3/06 (2006.01)
G06F 21/62 (2013.01)
G06F 12/14 (2006.01)

(52) U.S. Cl.
CPC ............ *G06F 3/0619* (2013.01); *G06F 3/065* (2013.01); *G06F 3/067* (2013.01); *G06F 12/1408* (2013.01); *G06F 21/6272* (2013.01); *G06F 2212/1052* (2013.01)

(58) Field of Classification Search
CPC ............. G06F 11/1451; G06F 21/6209; G06F 11/2053; G06F 21/305; G06F 3/0619; G06F 3/067; G06F 3/065; G06F 12/1408; G06F 2212/1052; G06F 21/6272
See application file for complete search history.

(56) References Cited

U.S. PATENT DOCUMENTS

| | | | |
|---|---|---|---|
| 2003/0023559 A1* | 1/2003 | Choi | H04L 63/0823 705/51 |
| 2007/0203917 A1 | 8/2007 | Du | |
| 2007/0220614 A1 | 9/2007 | Ellis | |
| 2008/0172428 A1* | 7/2008 | Stokes | G06F 21/80 |
| 2008/0215667 A1 | 9/2008 | Rothbarth | |
| 2009/0328171 A1 | 12/2009 | Bayus | |
| 2010/0042868 A1 | 2/2010 | Apelbaum | |

(Continued)

*Primary Examiner* — Hashem Farrokh
(74) *Attorney, Agent, or Firm* — Brundidge & Stanger, P.C.

(57) ABSTRACT

A virtual storage system in data communication with a user computing device via a communication network and methods of selectively or automatically copying electronic documents to a virtual storage system where the virtual storage system includes at least one processor configured to process, encrypt and copy electronic documents retrieved from an external system, and a plurality of redundant physical storage devices in data communication with the at least one processor and each configured to store the electronic documents retrieved from the external system.

10 Claims, 13 Drawing Sheets

(56) References Cited

U.S. PATENT DOCUMENTS

2013/0219176 A1* 8/2013 Akella ............... H04L 63/0815
                                                          713/165
2014/0215171 A1  7/2014 Daly, Jr.

* cited by examiner

VIRTUAL STORAGE SYSTEM AND METHODS OF COPYING ELECTRONIC DOCUMENTS INTO THE VIRTUAL STORAGE SYSTEM

CROSS-REFERENCE TO RELATED APPLICATIONS

The present application is a Continuation of application Ser. No. 13/751,982, filed Jan. 28, 2013, and to relates to application Ser. No. 13/752,008, filed on Jan. 28, 2013; Ser. No. 13/752,023, filed on Jan. 28, 2013; and Ser. No. 13/752,043, filed on Jan. 28, 2013, the entire disclosures of which are incorporated herein by reference."

BACKGROUND OF THE INVENTION

1. Field of the Invention

The present invention relates to a virtual storage system. More particularly, the present invention relates to a virtual storage system and methods of copying electronic documents into the virtual storage system.

2. Description of the Related Art

Virtual storage systems have become a popular alternative for storing files, thereby eliminating the need to install physical storage devices and minimizing file storage costs. A virtual storage system is an online storage system where data is stored in virtual storage pools. The pools are hosted by third parties that operate large data centers. The third parties virtualize resources in servers and present the resources as virtual storage pools for users to store files, for example. The virtual storage system is accessed through a web application programming interface (API), a gateway or a Web-based user interface (UI), for example. A typical virtual storage system (e.g., a cloud-type storage system) has several disadvantages which create security concerns. For example, the storage location of the files stored therein may be unknown to both third party hosting companies and/or users of the virtual storage system. In addition, the typical virtual storage system can be easily accessed over a communication network (e.g., the Internet) using simple single-factor authentication processes for access thereof. The typical virtual storage system does not encrypt files that are stored on their servers which makes the files easily visible to internal employees and hackers. Further, the typical virtual storage system is not Pci Compliant (PCI DSS) a proprietary information security standard for organizations that handle cardholder information for the major debit, credit, prepaid, e-purse, ATM, and POS cards. Further, once any file is stored on the virtual storage system they become property of the virtual storage system provider and are no longer user-owned; therefore the files can be used for other purposes, such as data mining without user permission.

Online banking systems provide resources to enable users to conduct banking transactions electronically from a personal computer, for example. Online banking transactions include monitoring accounts, conducting money transfers, applying for loans, submitting loan payments, etc. However, users are required to visit the bank in person, to conduct certain transactions such as depositing documents into a safe deposit box which is an individually secured container held in a bank vault, for example. The safe deposit box is used to store valuable possessions, such as jewelry, currency, marketable securities, and important documents (e.g., bank statements, wills, passports, property deeds, insurance policies, photographs and birth certificates). Bank personnel typically open the bank vault with a key and a user is required to produce an assigned key to open the safe deposit box.

Currently, online banking systems fail to allow users to store important documents electronically, and also fail to allow users to retrieve, view and share these documents electronically outside of the bank environment, when desired.

SUMMARY OF THE INVENTION

The present invention obviates the above-mentioned disadvantages by providing a virtual storage system that encrypts and copies electronic documents retrieved from an external system (e.g., an online banking system), to thereby enable a user to store important documents in a known storage location within the virtual storage system.

The present invention relates to virtual storage system and methods of selectively or automatically copying electronic documents (e.g., bank statements) into the virtual storage system.

Further, the virtual storage system of the present invention employs a multi-factor authentication process for verifying user access rights, via a specifically-designed application programming interface (API), for example, that can be installed at a user computing device, thereby providing a maximum security level of file storage for the user.

The virtual storage system of the present invention is also PCI Compliant following a proprietary information security standard to allow storage of cardholder information for the major debit, credit, prepaid, e-purse, ATM, and POS cards.

In addition, the virtual storage system locks each file with encryption as it is uploaded or copied, and only the user-owner holds the key (i.e., access rights) to retrieve the file, thereby leaving ownership of the file with the user-owner at all times and providing extra security protection from unauthorized individuals.

The present invention provides a virtual storage system in data communication with a user computing device via a communication network, which includes at least one processor configured to process, encrypt and copy electronic documents retrieved from an external system, and a plurality of redundant physical storage devices in data communication with the at least one processor and each configured to store the electronic documents retrieved from the external system.

Further, the present invention is a method implemented by computer system to effect the copying of electronic documents into the virtual storage system in data communication via a communication network, with an online document retrieval and storage system. The method includes receiving input data at the online document retrieval and storage system from a user at a computing device, via a communication network, requesting access to online account information, selecting and viewing an electronic document of the online account information to be copied, selecting a copy link within the electronic document, to copy the electronic document, viewing a plurality of electronic folders of the virtual storage system in a folder selection dialog, selecting via the user, a specific folder of the plurality of electronic folders for receiving and storing the electronic document selected, encrypting the electronic document via the virtual storage system, and copying the electronic document to the specific folder of the plurality of electronic folders.

Further, the present invention is a method implemented by a computer system to effect the automatic copying of electronic documents into a virtual storage system in data communication via a communication network, with an online document retrieval and storage system. The method includes processing an electronic document associated with a user, at the online document retrieval and storage system, determining whether the user has access rights to the virtual storage system, encrypting the electronic document via the virtual storage system when it is determined that the user has access rights to the virtual storage system, and automatically copying the electronic document to the virtual storage system.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, systems, networks, processes, and other components may be shown as components in block diagram form in order not to obscure the embodiments in unnecessary detail. Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The present invention as will be described in greater detail below provides a method for copying electronic documents, (e.g., electronic banking statements) into a virtual storage system and system implementing the method. The present invention provides various embodiments as described below. However it should be noted that the present invention is not limited to the embodiments described herein, but could extend to other embodiments as would be known or as would become known to those skilled in the art.

Figure 1:
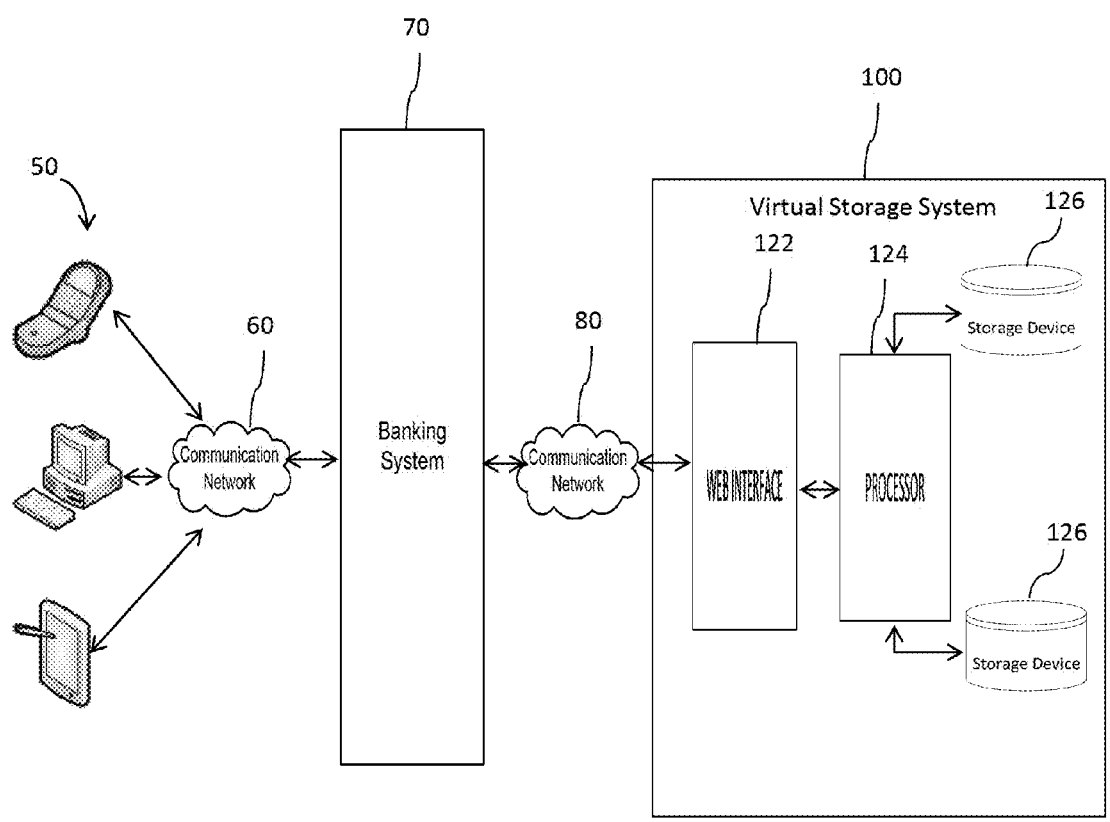
FIG. 1 is a block diagram of a virtual storage system that can be implemented within one or more embodiments of the present invention.

FIG. 1 is a block diagram of a virtual storage system implemented within one or more embodiments of the present invention. In FIG. 1, a user at a user computing device 50 is configured to access, via a communication network 60, an external system i.e., an online document retrieval and storage system such as a banking system 70 to perform online banking transactions, such as viewing bank accounts and bank statements, applying for loans, and other transactions. According to one or more embodiments, the user computing device 50 includes at least one of a mobile phone or smart phone, a personal computer or laptop, or a personal digital assistant (PDA) or tablet. The present invention is not limited to any particular type of user computing device 50, and may vary accordingly.

The user accesses the banking system 70 by inputting input data including identification and log-in information such as a user ID and password via a user interface (UI) of the user computing device 50. Once the identification/log-in information is received at a banking application of the banking system 70, the banking system 70 retrieves the user's banking information and displays the banking information via a display of the user computing device 50. The banking system 70 is configured to receive the input data and provide the user with electronic documents (e.g., bank statements) in webpage format or any other format over the communication network 60. The banking system 70 communicates via a communication network 80, with a virtual storage system 100 described in detail below.

The communication networks 60 and 80 include a wired or wireless network for data communication. The data communication across the communication networks 60 and 80 is achieved by using web services technology including for example, Web services Description Language (WSDL). The communication networks 60 and 80 may include any subsystem for exchanging data such as the Internet, intranet, extranet, wide area network (WAN), local area network (LAN), Restful web services, JAVAScript Object Notation (JSON), Extensible Mark-up Language (XML)-based communication network, Simple Object Access Protocol (SOAP)-based Services and satellite communication network. Further, the communication networks 60 and 80 can be other types of networks such as interactive television (ITV). According to one or more embodiments, the communication networks 60 and 80 may be the same or different types of networks.

The virtual storage system 100 is a user-specific storage system which allows each user to have a secure access to their files stored within the virtual storage system 100. In addition, the virtual storage system 100 encrypts each electronic document as it is retrieved from the external system, and only the user-owner can access the electronic document thereby leaving ownership of the files within the virtual storage system 100 with the user-owner at all times.

According to one or more embodiments, the virtual storage system 100 includes a web interface 122 for interfacing with the external system (i.e., the banking system 70) over the communication network 80. The web interface 122 provides a secure connection to the virtual storage system 100. According to one or more embodiments, the web interface 122 is a specifically-designed application programming interface (API), for example, which performs authentication of the user or the external system (e.g., the banking system 70) at multiple levels. A secure connection is made between the banking system 70 and the virtual storage system 100 on a transport layer level, for example. According to one or more embodiments, a transport layer security (TLS) or secure sockets layer (SSL) cryptographic protocol may be employed to provide secure communication over the communication networks 60 and 80. According to one or more embodiments, the web interface 122 is a web application programming interface (API), a gateway or a Web-based user interface (UI), for example. According to one or more embodiments, the virtual storage system 100 is PCI Compliant to allow storage of cardholder information for the major debit, credit, prepaid, e-purse, ATM, and POS cards. The virtual storage system 100 further includes at least one processor 124 for receiving information including requests from the user at the banking system 70 and processing the requests, such as storing, retrieving and copying electronic documents. The virtual storage system 100 further includes at least one storage server 125 comprising a plurality of physical storage devices 126 for storing files such as documents, audio files, photographs, movies, and images received from the user via the banking system 70. The virtual storage system 100 acts as a safe deposit box for receiving and securely storing the files received from the user via the banking system 70. Although only one processor 124 and two storage devices 126 are shown, the present invention is not limited hereto, and may vary accordingly.

As shown in FIG. 1, the virtual storage system 100 includes a web interface (e.g., the web interface 122) however the present invention is not limited to this particular configuration, and may vary accordingly.

Figure 2:
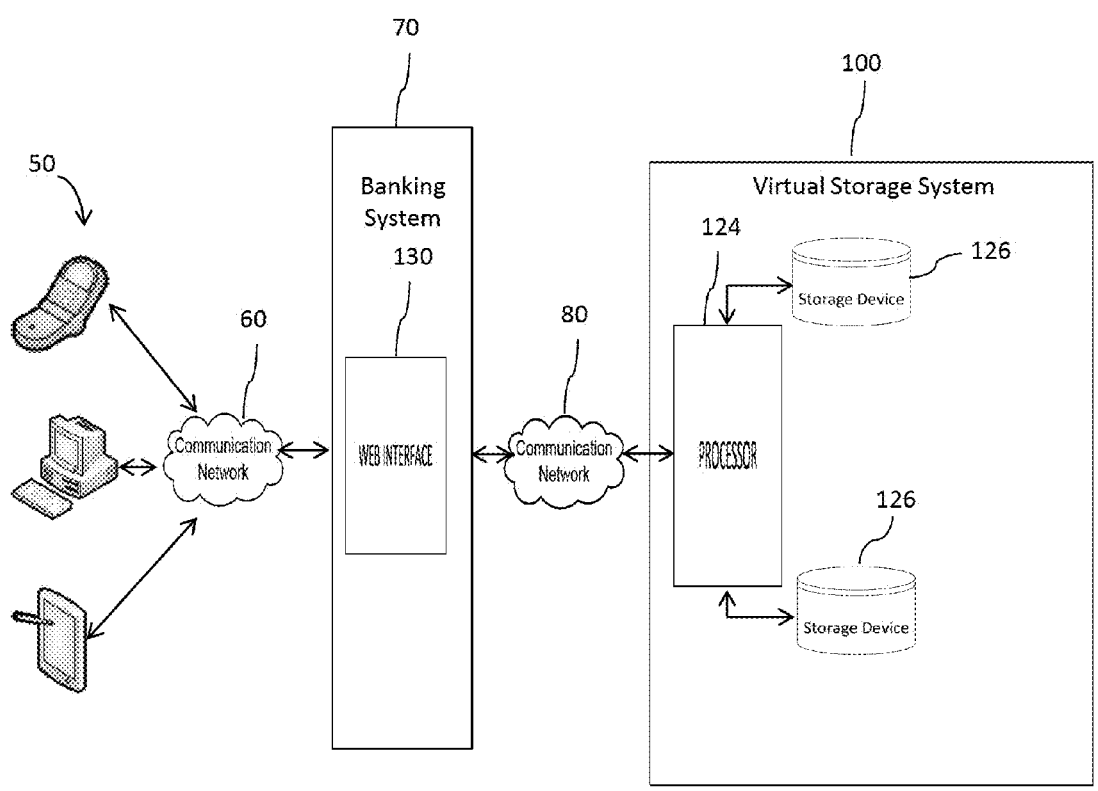
FIG. 2 is a block diagram of a virtual storage system that can be implemented within alternative embodiments of the present invention.
Figure 3:
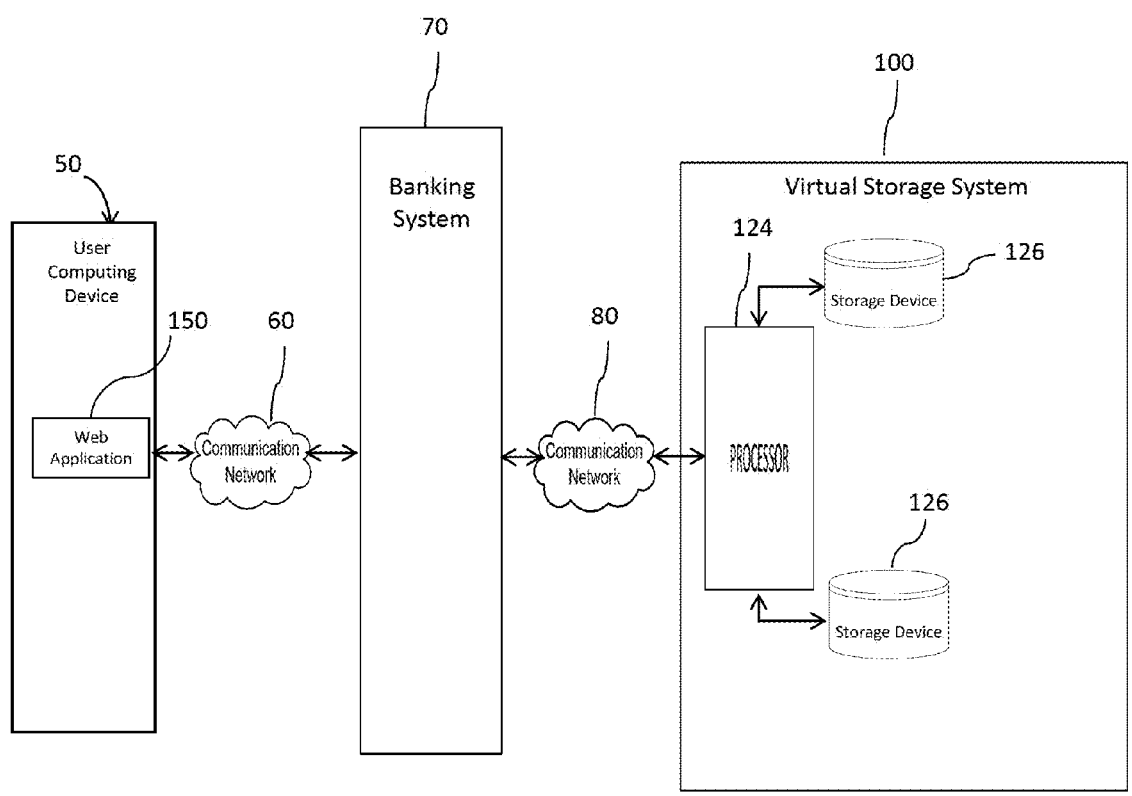
FIG. 3 is a block diagram of a virtual storage system that can be implemented within alternative embodiments of the present invention.
Figure 4:
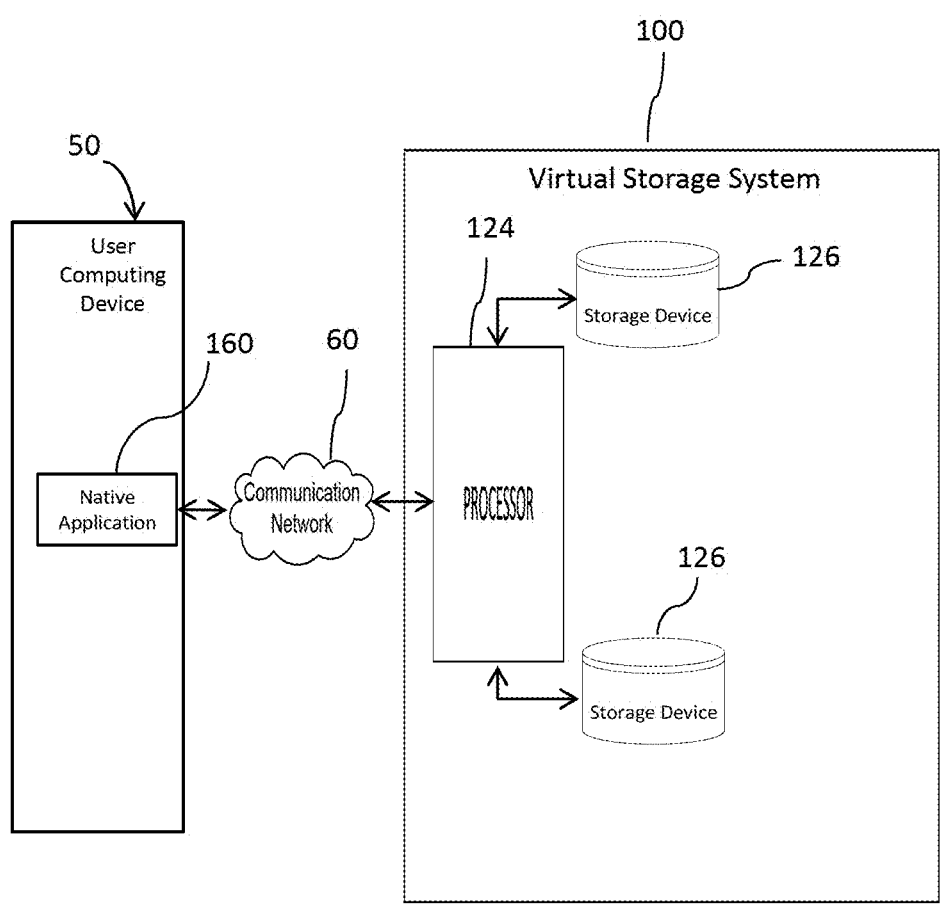
FIG. 4 is a block diagram of a virtual storage system that can be implemented within alternative embodiments of the present invention.

FIGS. 2 through 4 illustrate alternative configurations of the virtual storage system 100, and communication between the virtual storage system 100, the external system (e.g., the banking system 70), and/or the user computing device 50 according to other embodiments of the present invention that may be implemented. Some of the components shown in FIGS. 2 through 4 are the same as the components discussed above with reference to FIG. 1 therefore a detailed description of these components is omitted.

As shown in FIG. 2, in an alternative embodiment, the banking system 70 includes a web interface 130 configured to interface the banking system 70 with the virtual storage system 100 over the communication network 80. The web interface 130 functions in a similar manner as the web interface 122 of the virtual storage system 100 therefore in this embodiment, the web interface 122 of the virtual storage system 100 is omitted.

As shown in FIG. 3, in another alternative embodiment, the user computing device 50 includes a web application 150 (e.g., a web API) for connecting to the banking system 70 and the virtual storage system 100 indirectly through the banking system 70. The web application 150 is an internet-enabled application, for example, that has specific functionality for the user computing device 50 (e.g., a mobile phone). The web application 150 is accessed through a web browser of the user computing device 50 and does not require downloading and installing thereof onto the user computing device 50.

As shown in FIG. 4, in yet another alternative embodiment, the user computing device 50 includes a native application 160 for connecting directly to web services (i.e., the processor 124) of the virtual storage system 100. The native application 160 is directly installed on the user computing device 50 to allow the user to gain direct access to the virtual storage system 100. The native application 160 is a specifically-designed API for accessing the virtual storage system 100. For example, if the user computing device 50 is a tablet, the tablet may include a tablet API for directly accessing the web services of the virtual storage system 100. Therefore, in this embodiment, the web interface 130 of the banking system 70 as shown in the embodiment illustrated in FIG. 2; and the web interface 122 of the virtual storage system 100 as shown in FIG. 3 are omitted.

According to one or more embodiments, the native application 160 may include a multi-factor authentication process to be performed at many levels to enable a user to gain direct access to the virtual storage system 100 from the user computing device 50. The multi-factor authentication process may include steps such as sending login information (e.g., user ID and password information) in a correspondence (e.g., a text message or email) to the user, and providing a time-based one-time password system to the user via a third party.

According to another embodiment, a single-factor authentication process may be used to gain access to the virtual storage system 100 via the external system (e.g., the banking system 70) since the external system and the virtual storage system 100 communicate via a secure connection on the communication network 80.

Figure 13:
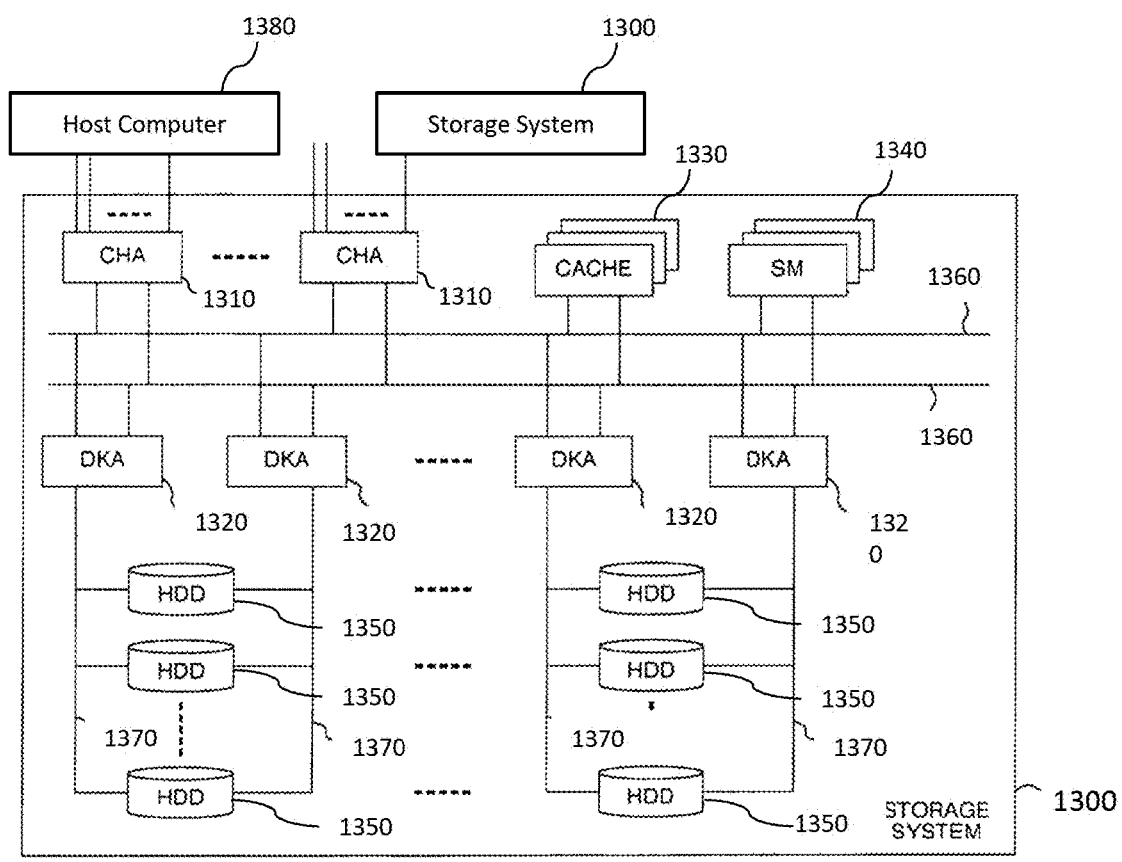
FIG. 13 is a block diagram of an exemplary physical storage system for implementation of the virtual storage system in accordance with one or more embodiments of the present invention.

It should be noted that the virtual storage system is implemented on a physical storage system 1300 such as that illustrated in FIG. 13.

As shown in FIG. 13, the physical storage system 1300 includes a plurality of host adapters (CHA) 1310, disk adapters (DKA) 1320, cache memories (CACHE) 1330, shared memories (SM) 1340, and hard disk drives (HDD) 1350 connected with each other via common paths 1360 and connection lines 1370. Each of the hard disk drives (HDD) 1350 is connected to two disk adapters 1320, for example, using different connection lines 1370. The host adapters 1310 control data transfer between host computers 1380, the cache memories 1330 and the hard disk drives 1350. The cache memories 1330 temporarily store data received from the host computer 1380 and data read from the hard disk drives 1350. The shared memories 1340 are shared between the host adapters 1310 and the disk adapters 1320. The present invention is not limited to any particular number of host adapters 1310, disk adapters 1320, cache memories 1330, shared memories 1340 and hard disk drives 1350, and may vary accordingly. The physical storage system 1300 is one example of a physical storage system for which the virtual storage system can be implemented thereon. The present invention is not limited to a particular configuration of the physical storage system. According to other embodiments, the hard disk drives (HDD) 1350 can be replaced with a flash storage, RAM disks or rotated disk drives, for example. The host computers 1380 can be the processor 124 or a separate computer, for example. Further, the virtual storage system 100 can be implemented on any type of storage system such as a network-attached storage (NAS), a storage area network (SAN), or a distributed memory array.

According to one or more embodiments, the physical storage devices of the physical storage system 1300 as described above can be configured in a RAID (Redundant Array of Independent Disks) configuration. Further, the reliability of the data stored in the storage devices 126 of the virtual storage system 100 can be stored in a redundant manner in redundant data centers using mirroring, remote copy, or the like. The use of redundant storage devices enables the data stored to be duplicated thereby preventing data loss.

When a user accesses the banking system 70 via a bank server, the user can be automatically directed to the virtual storage system 100 when desired.

As shown in FIGS. 1 through 4, the user computing device 50, banking system 70 and virtual storage system 100 can be connected with each other via the communication networks 60 and 80. According to one embodiment, the user computing device 50 may occasionally connect to the communication network 60 while the banking system 70 and the virtual storage system 100 may maintain a connection to the communication networks 60 and 80. Further, in FIG. 4 the user computing device 50 and the virtual storage system 100 are in direct communication with each other over the communication network 80.

According to alternative embodiments, the virtual storage system 100 can be included within the banking system 70 or the user computing device 50 as installable software.

Figure 5:
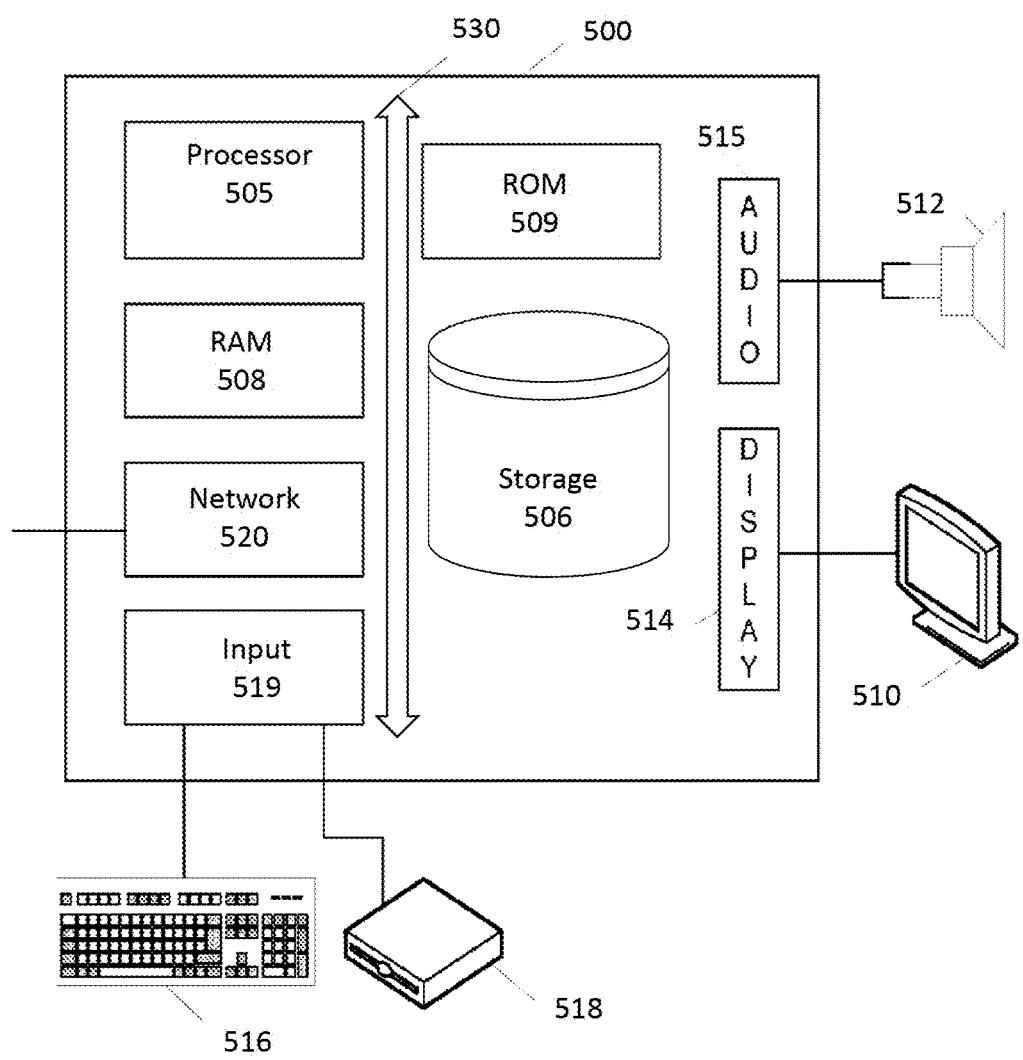
FIG. 5 is a block diagram of an exemplary computer to be implemented within one or more embodiments of the present invention.

FIG. 5 is a block diagram of an exemplary computing device 500 illustrating components of the computing device 50, the banking system 70 and the virtual storage system 100 shown in FIG. 1. As shown in FIG. 5, the computing device 500 includes various components for inputting, outputting, storing and processing data. The computing device 500 includes a processor 505 for performing tasks including executing one or more applications, retrieving data from a storage device e.g., storage 506, and/or outputting data. The processor 505 can be connected to a Random access memory (RAM) module 508 wherein application data and/or instructions may be temporarily stored. The computing device 500 can further includes a Read Only Memory (ROM) 509 configured to allow data stored thereon to persist after the computing device 500 is turned off and is used for storing an operating system (OS) of the computing device 500. The storage device 506 may also provide storage for data files and may include computer readable mediums e.g., disk drives, optical storage mediums e.g., CD ROM drives, magnetic tape storage systems, and flash memory. The processor 505 is configured to retrieve an application from the storage 506 and store the instructions associated with the application in the RAM module 508, while the processor 505 is executing the application. The computing device 500 further includes output devices e.g., a display device 510, and a speaker 512, for outputting visual and audio data via a display adapter 514 and an audio adapter 515. Further, the computing device 500 includes input devices e.g., a keyboard 516, a storage media drive 518, and microphone each having an associated adapter 519 for converting the input data into computer readable data. The storage media drive 518 enables users to read and write data to and from the storage media.

Further, as shown in FIG. 5, the computing device 500 includes one or more components for receiving and transmitting data over the communication networks 60 and 80. For example, a network adapter 520 is provided for communication with one or more computing devices over an IP network, for example, for transmission of data such as financial data over a bank network. The network adapter 520 may include instructions associated with processing IP network packets and cellular network packets. The components of the computing device 500 are connected via a system bus 530.

Figure 6:
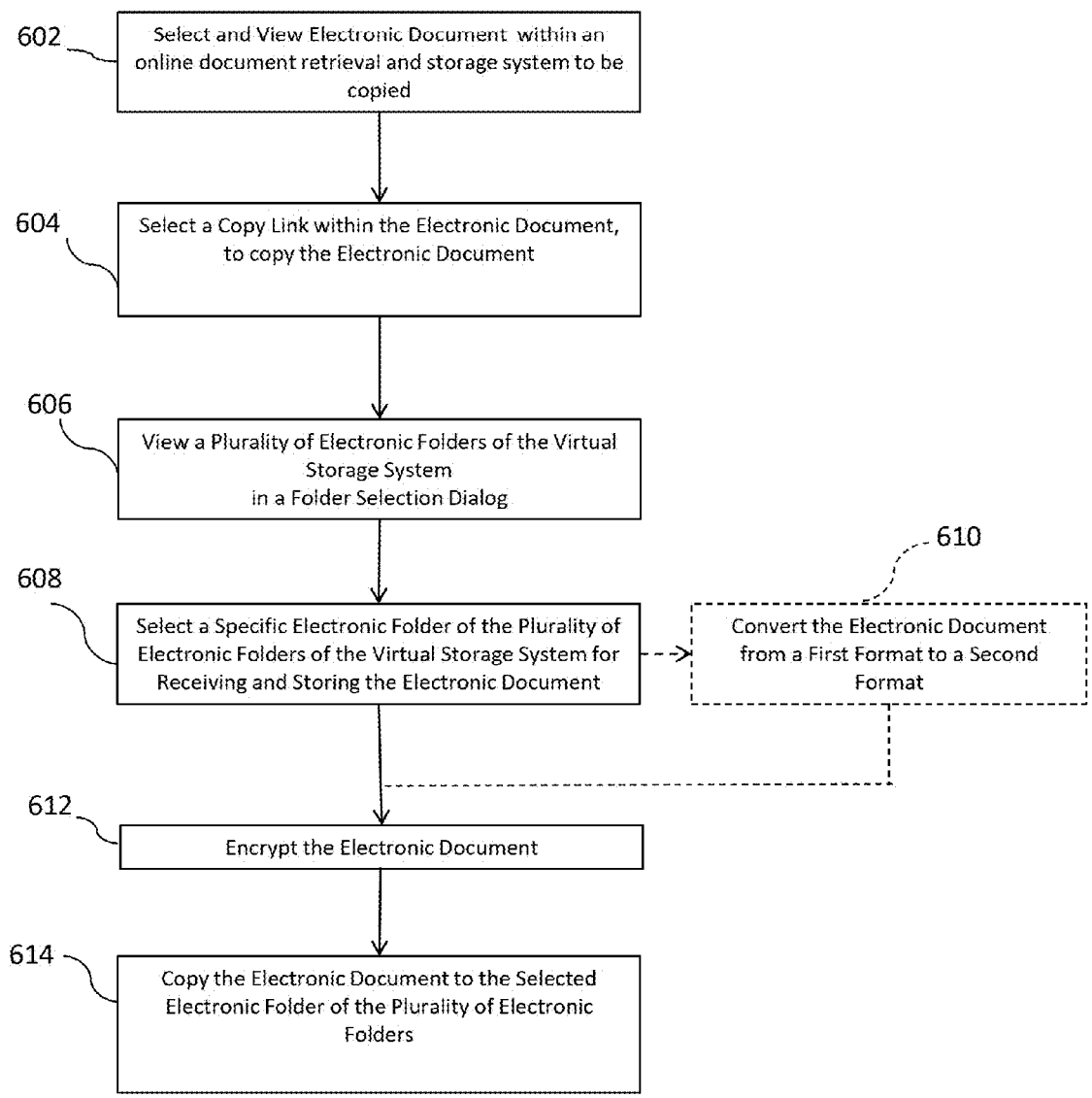
FIG. 6 is a flowchart illustrating a method of selectively copying electronic documents into the virtual storage system of FIG. 1 according to one or more embodiments of the present invention.

FIG. 6 is a flowchart illustrating a method 600 for illustrating a method of selectively copying electronic documents into the virtual storage system 100 of FIG. 1 according to one or more embodiments of the present invention. The method 600 is implemented in software modules for execution by the user computing device 50, the banking system 70 and the virtual storage system 100.

In method 600, the online document retrieval and storage system (e.g., the banking system 70) receives input data from the user at the user computing device 50 for requesting access to online account information (e.g., banking information). At operation 602, the user selects and views an electronic document within a banking application of the banking system 70 to be copied. From operation 602, the process continues to operation 604, where the user selects a copy link within the electronic document to copy the electronic document. From operation 604, the process continues to operation 606 where the user views a plurality of electronic folders of the virtual storage system 100 in a folder selection dialog, to receive and store the electronic documents. From operation 608, the process continues to operation 608 where the user selects a specific folder of the plurality of electronic folders for receiving and storing the electronic document selected.

At operation 610 an optional format conversion process is performed on the electronic document, whereby the electronic document is converted from a first format such as Hyper Text Markup Language (HTML) format to a second format such as portable document format (PDF), for copying and storing.

Upon completion of the format conversion, the process continues to operation 612 where the electronic document is encrypted within the virtual storage system 100.

From operation 612 the process continues to operation 614 where the electronic document is copied to the selected folder of the plurality of electronic folders (i.e., the electronic documents are stored in the storage devices 126 of the virtual storage system 100).

The electronic document is accessible only by the user at the user computing device 50 via the banking system 70 according to one embodiment, or via the virtual storage system 100 directly according to alternative embodiments. The electronic document copy and format conversion operations are performed via the processor 124 of the virtual storage system 100. According to one or more embodiments, the encryption operation may be performed in one storage location of the virtual storage system 100 (e.g., a first data center), and the copying operation may be performed in another storage location (e.g., a second data center) of the virtual storage system 100.

Figure 7:
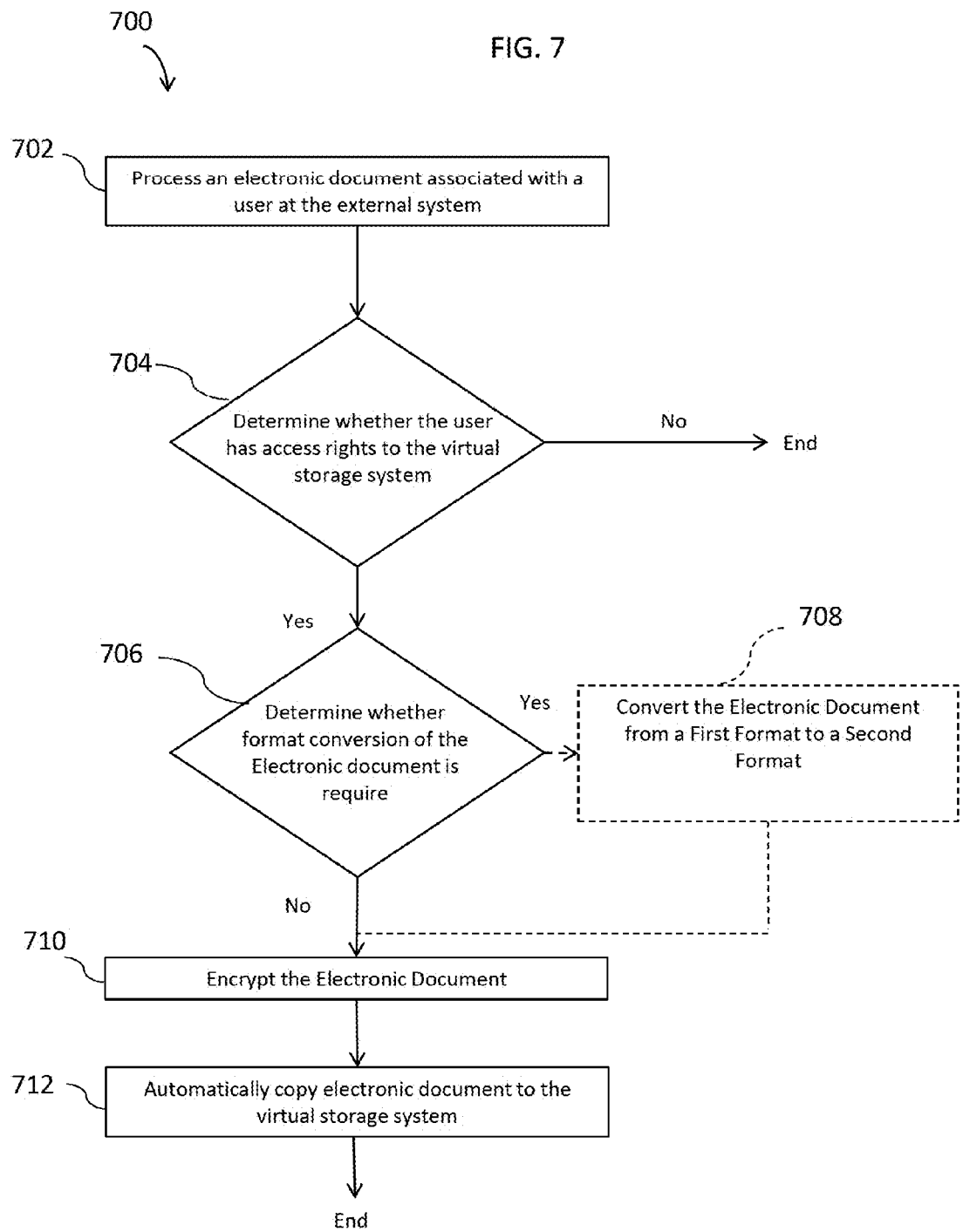
FIG. 7 is a flowchart illustrating a method of automatically copying electronic documents into the virtual storage system of FIG. 1 according to one or more embodiments of the present invention.

According to other embodiments of the present invention, the copying of electronic documents can be performed automatically without user input. FIG. 7 is a flowchart illustrating a method 700 of automatically copying electronic documents into the virtual storage system of FIG. 1 according to one or more embodiments of the present invention. In this embodiment, electronic documents are automatically copied from the external system (e.g., the banking system 70) into the virtual storage system 100 when the user has access rights to the virtual storage system 100. At operation 702, the process begins where an electronic document associated with a user (e.g., a banking statement) is processed at the external system (e.g., the banking system 70). The processing is performed internally within the banking system 70. From operation 702, the process continues to operation 703, where it is determined whether the user has access rights to the virtual storage system 100. In one or more embodiments, if the user is accessing the virtual storage system 100 indirectly through the banking system 70, access rights of the user may have been established by virtue of the user's access rights to the banking system 70. Thus, a verification process may be performed by the virtual storage system 100 at the banking system 70, via the secure connection over the communication network 80. Alternatively, if the user is accessing the virtual storage system 100 directly via the user computing device, access rights of the user may be verified by performing a multi-factor authentication process as discussed above If it is determine that the user does not have access rights to the virtual storage system 100, the process ends.

If it is determined at operation 703 that the user has access rights, the process continues to operation 706, where it is determined whether format conversion of the electronic document is required. If it is determined at operation 706 that format conversion is required, the process continues to operation 708 where the optional format conversion process is performed on the electronic document, whereby the electronic document is converted from a first format such as Hyper Text Markup Language (HTML) format to a second format such as portable document format (PDF), for copying and storing. According to one or more embodiments, operation 708 is performed similar to operation 610 shown in FIG. 6.

Upon completion of the format conversion, the process continues to operation 710 where the electronic document is encrypted within the virtual storage system 100.

From operation 710, the process continues to operation 712 where the electronic document is automatically copied to a selected folder of the plurality of electronic folders (i.e., the electronic documents are stored in the storage devices 126 of the virtual storage system 100).

The electronic document is accessible only by the user at the user computing device 50 via the banking system 70 according to one embodiment, or via the virtual storage system 100 directly according to alternative embodiments. The electronic document copy and conversion operations are performed via the processor 124 of the virtual storage system 100.

According to alternative embodiments, if it is determined at operation 706 that format conversion is not required, the process bypasses operation 708 and continues to operation 712 where the electronic document is copied to the virtual storage system 100.

According to alternative embodiments, if a user does not have access rights, upon providing a user with access rights (e.g., by registration process), all or a selection of electronic documents can be automatically copied from the external system into the virtual storage system 100. For example, upon being granted access rights to the virtual storage system 100, the user may be prompted to copy all or a selection of their electronic documents from the external system (e.g., the banking system 70) into the virtual storage system 100. If so, the electronic documents will be automatically copied to the virtual storage system 100.

The present invention is described herein in terms of block components, screen shots, and optional selections and processing steps. It should be appreciated that the functional blocks may be realized by any number of hardware and/or software components configured to perform the specified functions. For example, the present invention may employ various integrated circuits e.g., memory elements, processing elements, logic elements, look-up tables, and others which may perform the functions under the control of one or more processors or other control devices. The software components can be implemented with any programming or scripting language, with various algorithms implemented with data structures, objects, processes, and other programming elements.

An exemplary process of the method of FIG. 6 will be described with reference to the screen shots shown in FIGS. 8 through 12.

Figure 8:
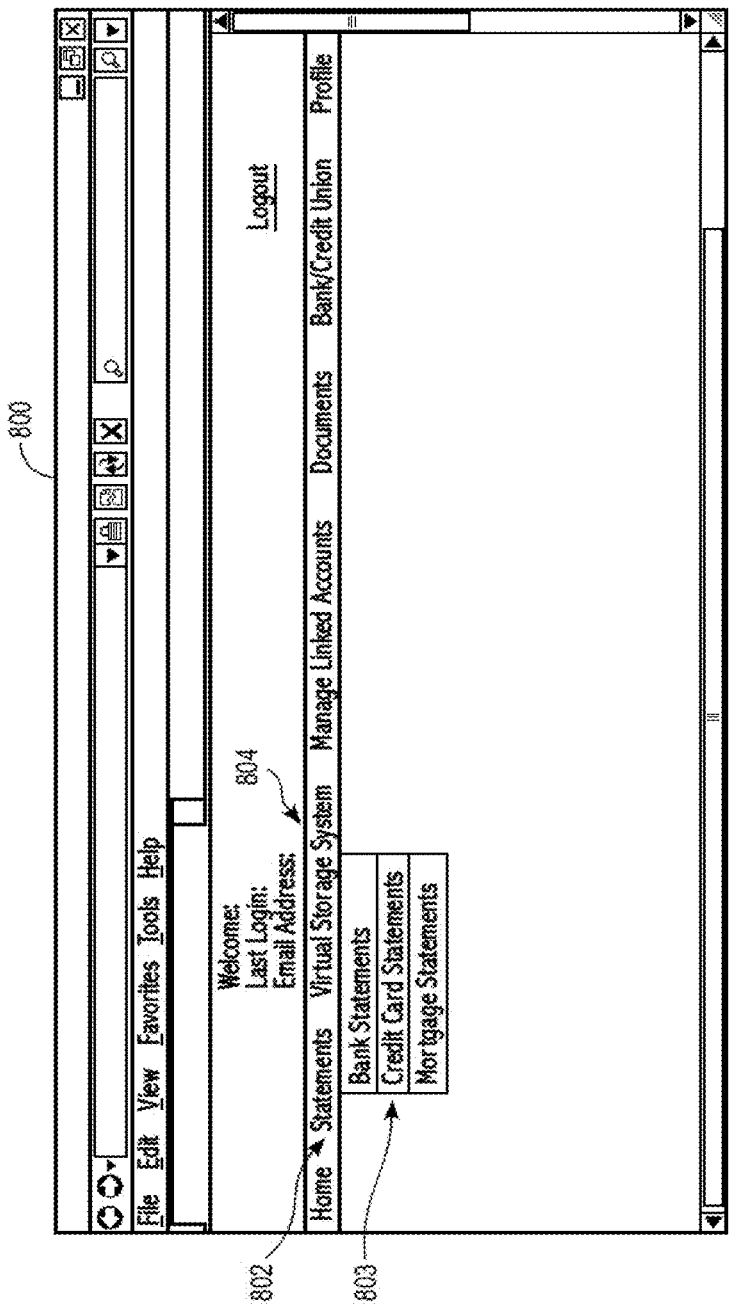
FIG. 8 is a screen shot of a banking system that can be implemented within one or more embodiments of the present invention.

As shown in FIG. 8, the screen shot 800 for a user to access banking information via the user computing device 50. As shown, the user has access to electronic statements at a link 802 via a dropdown window 403 and the virtual storage system 100 via a link 804. The user also has access to various other banking information and links for performing banking transactions (e.g., a managed link accounts link). The screen shot 800 is implemented for example, via a web page for network transmission. The web page may include standard HTML documents, and various forms JAVA® applets, active server pages (ASP), common gateway interface scripts (CGI), extensive markup language (SML), dynamic HTML, plugins, etc.

The user selects and views electronic statements (e.g., regular account statements, credit card billing statements, or loan statements), via the dropdown window 803, for example (operation 602 of FIG. 6).

Figure 9:
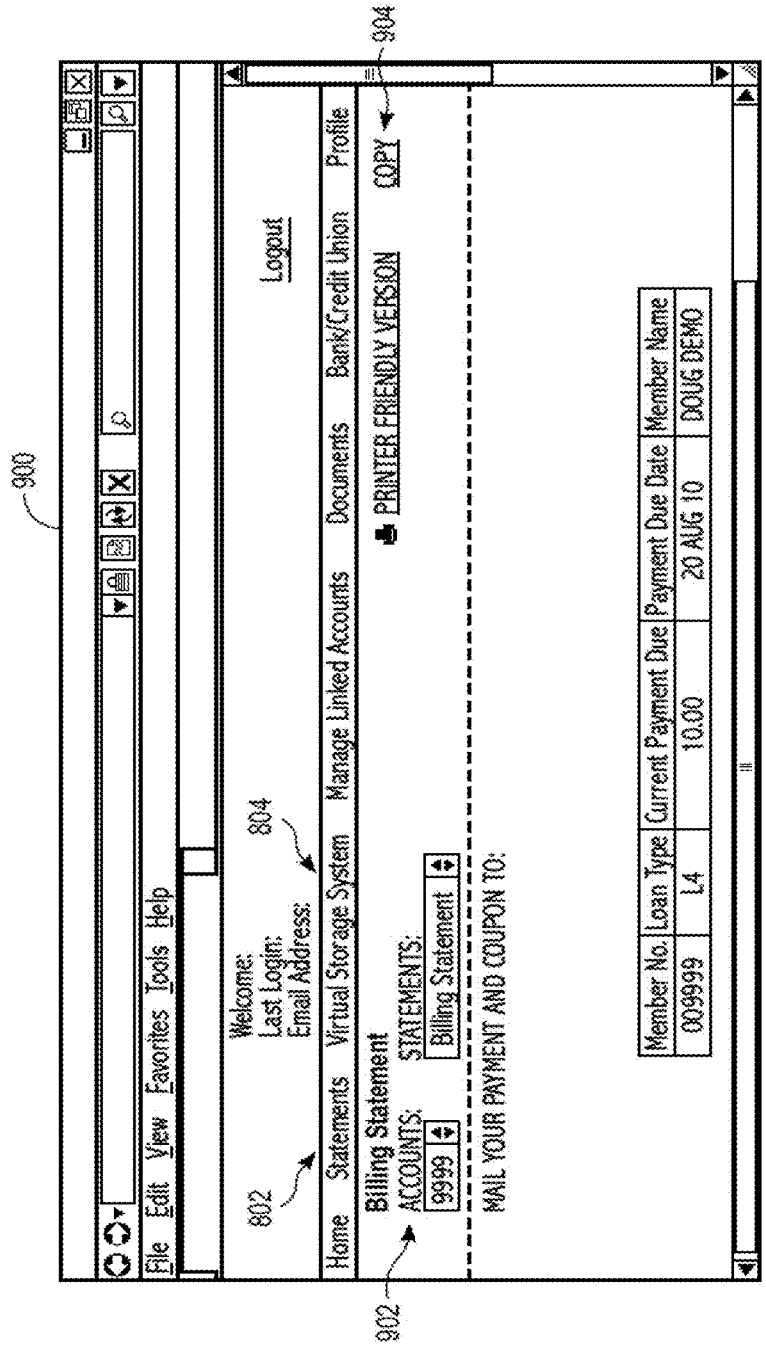
FIG. 9 is a screen shot of an exemplary electronic document that can be implemented within one or more embodiments of the present invention.

FIG. 9 is a screen shot 900 of an electronic document 902 (e.g., a credit card billing statement) as selected by the user. The electronic document 902 includes a copy link 904 for copying the electronic document 902 as desired by the user.

The user selects the copy link 904 within the electronic document 902 to copy the electronic document (operation 604 of FIG. 6).

Figure 10:
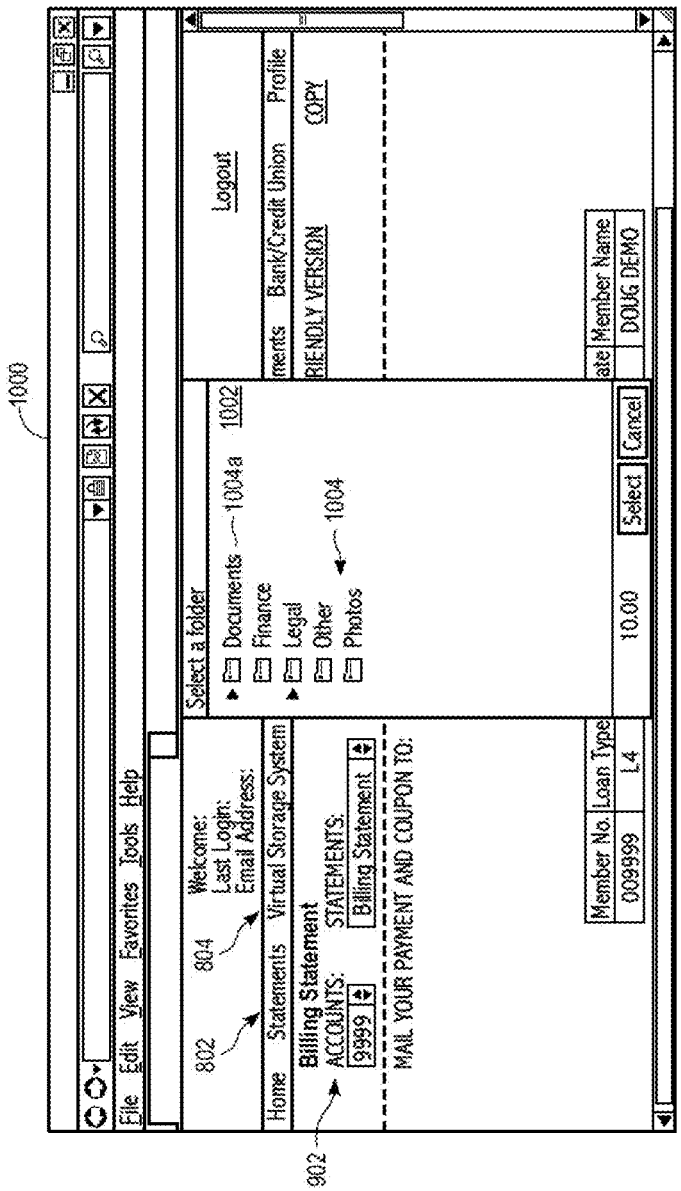
FIG. 10 is a screen shot of an electronic folder selection operation of FIG. 6 that can be implemented within one or more embodiments of the present invention.

After selecting to copy the electronic document 902, the user views a plurality of electronic folders in a folder selection dialog as shown in FIG. 10.

FIG. 10 is a screen shot 1000 of a folder selection dialog 1002 display a plurality of electronic folders 1004 (e.g., a documents folder, finance folder, legal folder, other folder, and photos folder) for selection (operation 606 of FIG. 6). The user selects a specific folder (e.g., the documents folder 1004a) of the plurality of electronic folders 1004 for receiving and storing the electronic document 902 (operation 608 of FIG. 6).

Figure 11:
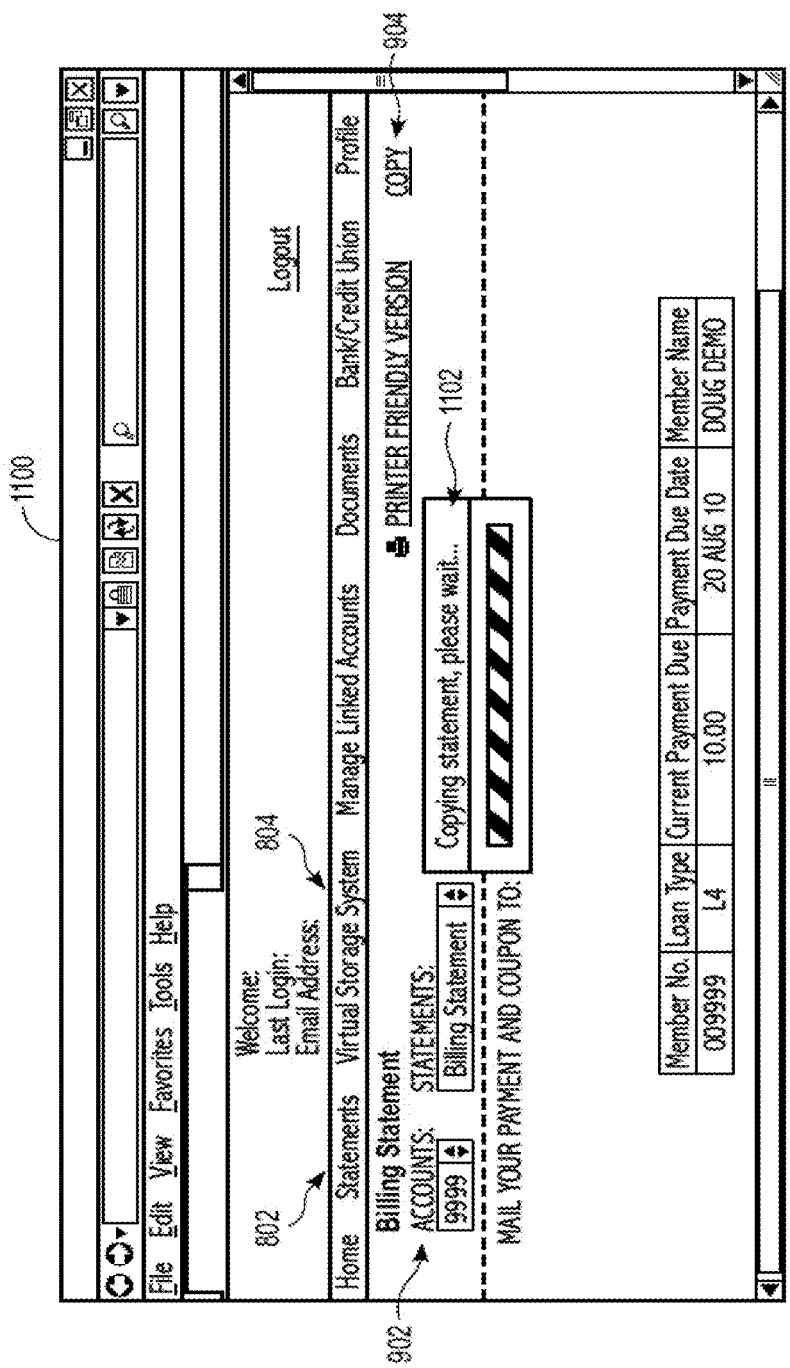
FIG. 11 is a screen shot of a copying operation of FIG. 6 that can be implemented within one or more embodiments of the present invention.

FIG. 11 is a screen shot 1100 showing a processing window 1102 indicating that the electronic document 902 is being processed (e.g., converted and/or copied). The electronic document 902 may optionally be converted from the first format (e.g., HTML format) to the second format (e.g., PDF format) for storing in an electronic folder 1004. According to one or more embodiments, the format conversion operation is an optional processing step (as indicated by the dashed line) and therefore may be omitted.

Figure 12:
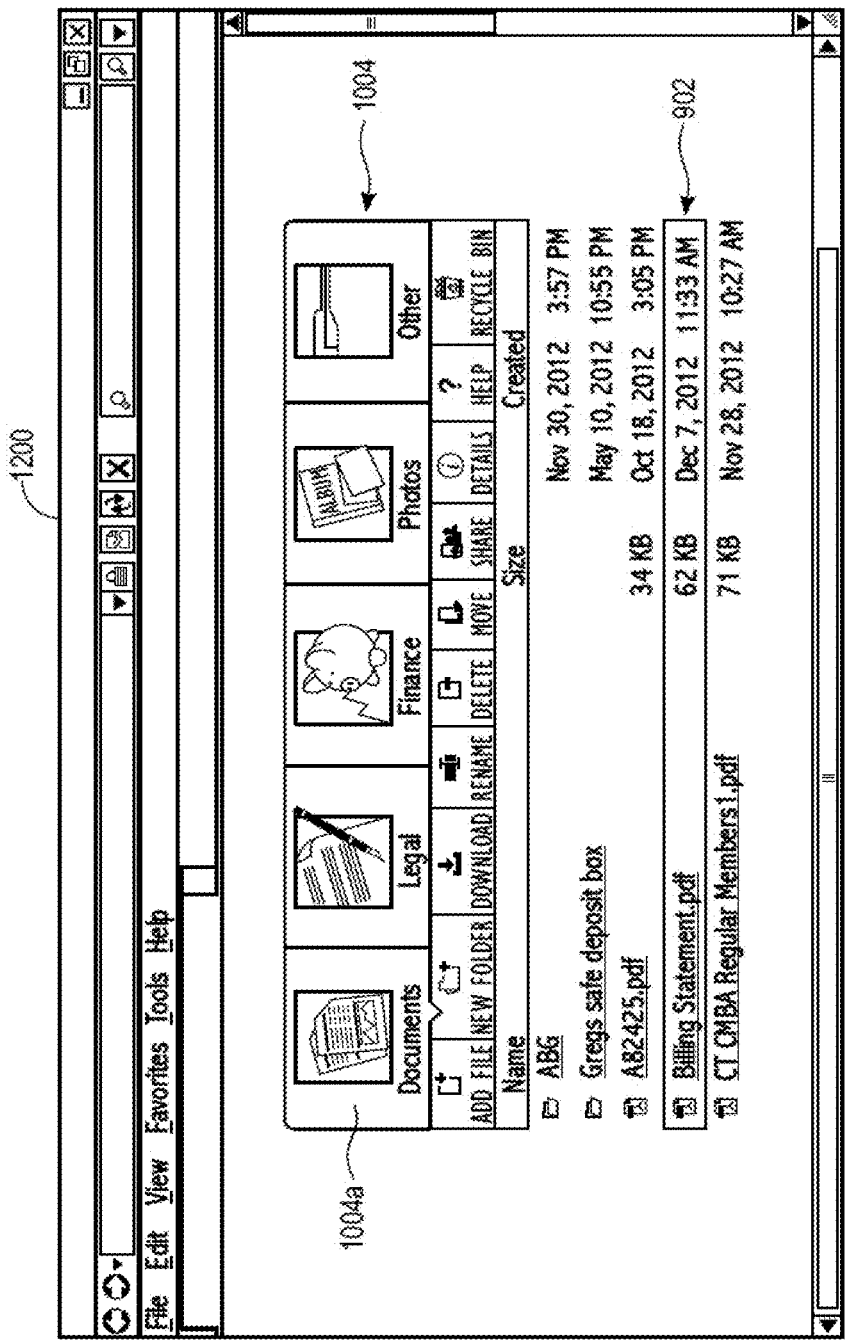
FIG. 12 is a screen shot of the virtual storage system 100 of FIG. 1 that can be implemented within one or more embodiments of the present invention.

As shown in FIG. 12, as shown in screen shot 1200, the electronic document 902 is copied into the selected electronic folder (e.g., the documents folder 1004a) of the plurality of folders 1004. The user is able to retrieve the electronic document 902 stored within the virtual storage system 100 by accessing the banking system 70 via the communication network 60 and by accessing the virtual storage system 100 via the communication network 80 or by accessing the virtual storage system 100 directly.

In view of the above, the present method embodiment may therefore take the form of a computer or controller implemented processes and apparatuses for practicing those processes. This disclosure can also be embodied in the form of computer program code containing instructions embodied in tangible media, such as floppy diskettes, CD ROMs, hard drives, or any other computer-readable storage medium, wherein, when the computer program code is loaded into and executed by a computer or controller, the computer becomes an apparatus for practicing the invention. This disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

According to one or more embodiments, a virtual storage system in data communication with a user computing device via a communication network is provided. The virtual storage system includes at least one processor configured to process and copy electronic documents retrieved from an external system, and a plurality of redundant physical storage devices in data communication with the at least one processor and each configured to store the electronic documents retrieved from the external system.

According to one or more embodiments, a method implemented by computer system to effect the copying of electronic documents into a virtual storage system in data communication via a communication network, with an online document retrieval and storage system is provided. The method comprising receiving input data at the online document retrieval and storage system from a user at a computing device, via a communication network, requesting access to online account information, selecting and viewing an electronic document of the online account information to be copied, selecting a copy link within the electronic document, to copy the electronic document, viewing a plurality of electronic folders of the virtual storage system in a folder selection dialog, selecting via the user, a specific folder of the plurality of electronic folders for receiving and storing the electronic document selected, and copying the electronic document to the specific folder.

According to one or more embodiments, a method implemented by a computer system to effect the automatic copying of electronic documents into a virtual storage system in data communication via a communication network, with an online document retrieval and storage system is provided. The method includes processing an electronic document associated with a user, at the online document retrieval and storage system, determining whether the user has access rights to the virtual storage system, and automatically copying the electronic document to the virtual storage system, when it is determined that the user has access rights to the virtual storage system.

According to one or more embodiments, a computer readable medium storing computer executable instructions that, when executed, cause a computing device to perform a method of copying electronic documents into a virtual storage system in data communication via a communication network, with an online document retrieval and storage system is provided. The method comprising receiving input data at the online document retrieval and storage system from a user at a computing device, via a communication network, requesting access to online account information, selecting and viewing an electronic document of the online account information to be copied, selecting a copy link within the electronic document, to copy the electronic document, viewing a plurality of electronic folders of the virtual storage system in a folder selection dialog, selecting via the user, a specific folder of the plurality of electronic folders for receiving and storing the electronic document selected, and copying the electronic document to the specific folder.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A method implemented by computer system to effect the copying of electronic documents into a virtual storage system in data communication via a communication network, with an online document retrieval and storage system, the method comprising:
   receiving input data at the online document retrieval and storage system from a user at a computing device, via a communication network, requesting access to online account information;
   selecting and viewing an electronic document of the online account information to be copied;
   selecting a copy link within the electronic document, to copy the electronic document;
   viewing a plurality of electronic folders of the virtual storage system in a folder selection dialog;

selecting via the user, a specific folder of the plurality of electronic folders for receiving and storing the electronic document selected;
encrypting the electronic document via the virtual storage system at a first data center location of the virtual storage system; and
copying the encrypted electronic document to the specific folder of the plurality of electronic folders at a second data center location of the virtual storage system.

2. The method of claim 1, further comprising:
converting the electronic document from a first format to a second format prior to encrypting the electronic document.

3. The method of claim 1, wherein the online document retrieval and storage system is a banking system and the electronic document is a bank statement.

4. A method implemented by computer system to effect the automatic copying of electronic documents into a virtual storage system in data communication via a communication network, with an online document retrieval and storage system, the method comprising:
processing an electronic document associated with a user, at the online document retrieval and storage system;
determining whether the user has access rights to the virtual storage system;
encrypting the electronic document via the virtual storage system when it is determined that the user has access rights at a first data center location of the virtual storage system, and
automatically copying the encrypted electronic document to the virtual storage system at a second data center location of the virtual storage system.

5. The method of claim 4, further comprising:
converting the electronic document from a first format to a second format prior to encrypting the electronic document.

6. The method of claim 4, wherein determining whether the user has access rights comprises:
verifying user access rights at the online document retrieval and storage system via the virtual storage system over the communication network, when the user is indirectly accessing the virtual storage system via the online document retrieval and storage system; or
performing a multi-factor authentication process when the user is directly accessing the virtual storage system.

7. A non-transitory computer readable medium storing computer executable instructions that, when executed, cause a computing device to perform a method of copying electronic documents into a virtual storage system in data communication via a communication network, with an online document retrieval and storage system, the method comprising:
receiving input data at the online document retrieval and storage system from a user at a computing device, via a communication network, requesting access to online account information;
selecting and viewing an electronic document of the online account information to be copied;
selecting a copy link within the electronic document, to copy the electronic document;
viewing a plurality of electronic folders of the virtual storage system in a folder selection dialog;
selecting via the user, a specific folder of the plurality of electronic folders for receiving and storing the electronic document selected;
encrypting the electronic document via the virtual storage system at a first data center location of the virtual storage system; and
copying the encrypted electronic document to the specific folder of the plurality of electronic folders at a second data center location of the virtual storage system.

8. The computer readable medium of claim 7, the method further comprising:
converting the electronic document from a first format to a second format prior to encrypting the electronic document.

9. The computer readable medium of claim 7, wherein the online document retrieval and storage system is a banking system and the electronic document is a bank statement.

10. The computer readable medium of claim 7, wherein the communication network is a wireless network.

* * * * *